US010359856B1

(12) United States Patent
Lin et al.

(10) Patent No.: US 10,359,856 B1
(45) Date of Patent: Jul. 23, 2019

(54) TACTILE FEEDBACK SYSTEM USING BIONIC TENDONS

(71) Applicant: ACER INCORPORATED, New Taipei (TW)

(72) Inventors: Jia-Yu Lin, New Taipei (TW); Chih-Chiang Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/190,040

(22) Filed: Nov. 13, 2018

(30) Foreign Application Priority Data

Jul. 23, 2018 (TW) .............................. 107125369 A (51) Int. Cl.
*H04B 3/36* (2006.01)
*G06F 3/01* (2006.01)
*A63F 13/28* (2014.01)

(52) U.S. Cl.
CPC .............. *G06F 3/016* (2013.01); *G06F 3/011* (2013.01); *A63F 13/28* (2014.09)

(58) Field of Classification Search
CPC ........... G06F 3/016; G06F 3/011; A63F 13/28
USPC ....................................................... 340/407.1
See application file for complete search history.

(56) References Cited

U.S. PATENT DOCUMENTS

| 2006/0184211 | A1* | 8/2006 | Gaunt | ................... | A61B 5/0028 607/48 |
| 2010/0094188 | A1* | 4/2010 | Goffer | .................... | B25J 9/0006 602/23 |
| 2013/0226048 | A1* | 8/2013 | Unluhisarcikli | ......... | A61H 3/00 601/34 |
| 2013/0310979 | A1* | 11/2013 | Herr | ...................... | B62D 57/032 700/258 |
| 2014/0070957 | A1* | 3/2014 | Longinotti-Buitoni | ...................... | A61B 5/6804 340/870.01 |
| 2014/0318699 | A1* | 10/2014 | Longinotti-Buitoni | ...................... | A61B 5/0002 156/247 |
| 2015/0324646 | A1* | 11/2015 | Kimia | ....................... | G06T 7/80 348/62 |
| 2017/0106738 | A1* | 4/2017 | Gillett | ................... | B60K 7/0007 |
| 2017/0192496 | A1* | 7/2017 | Balslev | .................... | G06F 3/011 |
| 2017/0215768 | A1* | 8/2017 | Belfiori | ................... | G06F 1/163 |

(Continued)

FOREIGN PATENT DOCUMENTS

| CN | 102915111 B | 5/2017 |
| CN | 106933340 A | 7/2017 |

(Continued)

*Primary Examiner* — Kerri L McNally
*Assistant Examiner* — Thang D Tran
(74) *Attorney, Agent, or Firm* — Winston Hsu (57) ABSTRACT

A VR tactile feedback system includes a hub, a feedback point wearable device set, a bionic tendon set, a motor device, and an MCU. The feedback point wearable device set includes multiple wearable devices which can be put on multiple feedback parts of a user. The bionic tendon set includes multiple bionic tendons each having a first end connected to a corresponding wearable device and a second end accommodated in the hub. The motor device is configured to apply multiple pulling forces to the multiple bionic tendons. The MCU is configured to instruct the motor device to adjust the values of the pulling forces according to VR content, thereby providing a corresponding tactile feedback at each feedback part of the user.

10 Claims, 7 Drawing Sheets

(56) References Cited

U.S. PATENT DOCUMENTS

2017/0249810 A1* 8/2017 Zerick .................... A41D 1/002
2018/0173797 A1* 6/2018 Wrigg ................ G09B 19/0038

FOREIGN PATENT DOCUMENTS

TW            201642943 A     12/2016
TW            201821139 A      6/2018

* cited by examiner

TACTILE FEEDBACK SYSTEM USING BIONIC TENDONS

CROSS REFERENCE TO RELATED APPLICATION

This application claims priority of Taiwan Application No. 107125369 filed on 2018 Jul. 23.

BACKGROUND OF THE INVENTION

1. Field of the Invention

The present invention provides a tactile feedback system, and more particularly, to a tactile feedback system using bionic tendons.

2. Description of the Prior Art

Virtual reality (VR) is an interactive computer-generated experience taking place within a simulated environment, that incorporates mainly auditory and visual, but also other types of sensory feedback like haptic. VR technologies provide a user wearing special display equipment with an immersive environment similar to the real world and allow the user to interact with a VR object or other users.

In addition to VR headsets, VR gloves are wearable VR gaming motion controllers capable of transforming human's hand actions in digital inputs. Meanwhile, in order to simulate various tactile feedbacks in a VR application (such as shooting recoil, the weight when lifting an object or steering wheel force feedback), some existing VR gloves adopt an electrical muscle stimulation (EMS) technique for providing tactile feedbacks. The principle of EMS is similar to electrotherapy in medical treatment which involves the elicitation of muscle contraction using electric impulses. For example, when the user picks up a heavy object in the VR environment, the controller sends a command to stimulate certain electrodes in the VR gloves for triggering muscle contraction on certain part of human body, thereby allowing the user to receive the tactile feedback simulating the burden of the heavy object. However, the implementation of EMS in VR applications has several limitations. In addition to poor accuracy due to human sweat which may change the conductivity between the electrodes and the skin, the material of the electrodes may induce allergic reactions on some people. Also, since the user normally spends a long time to play VR games, there is a risk of burning the skin when frequently providing tactile feedbacks using EMS. It may even be lethal for a user who carries an implantable defibrillator (ICD).

SUMMARY OF THE INVENTION

The present invention provides a tactile feedback system using bionic tendons which includes a hub, a feedback point wearable device, a bionic tendon set, a motor device, and a micro controller unit. The feedback point wearable device set includes a feedback point wearable device which is put on a feedback part of a user. The bionic tendon set includes a bionic tendon having a first end fixed to the feedback point wearable device and a second end accommodated in the hub. The motor device is configured to apply a pulling force to the bionic tendon. The micro controller unit is configured to instruct the motor device to adjust a value of the pulling force according to a virtual reality content, thereby providing a tactile feedback at the feedback part of the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
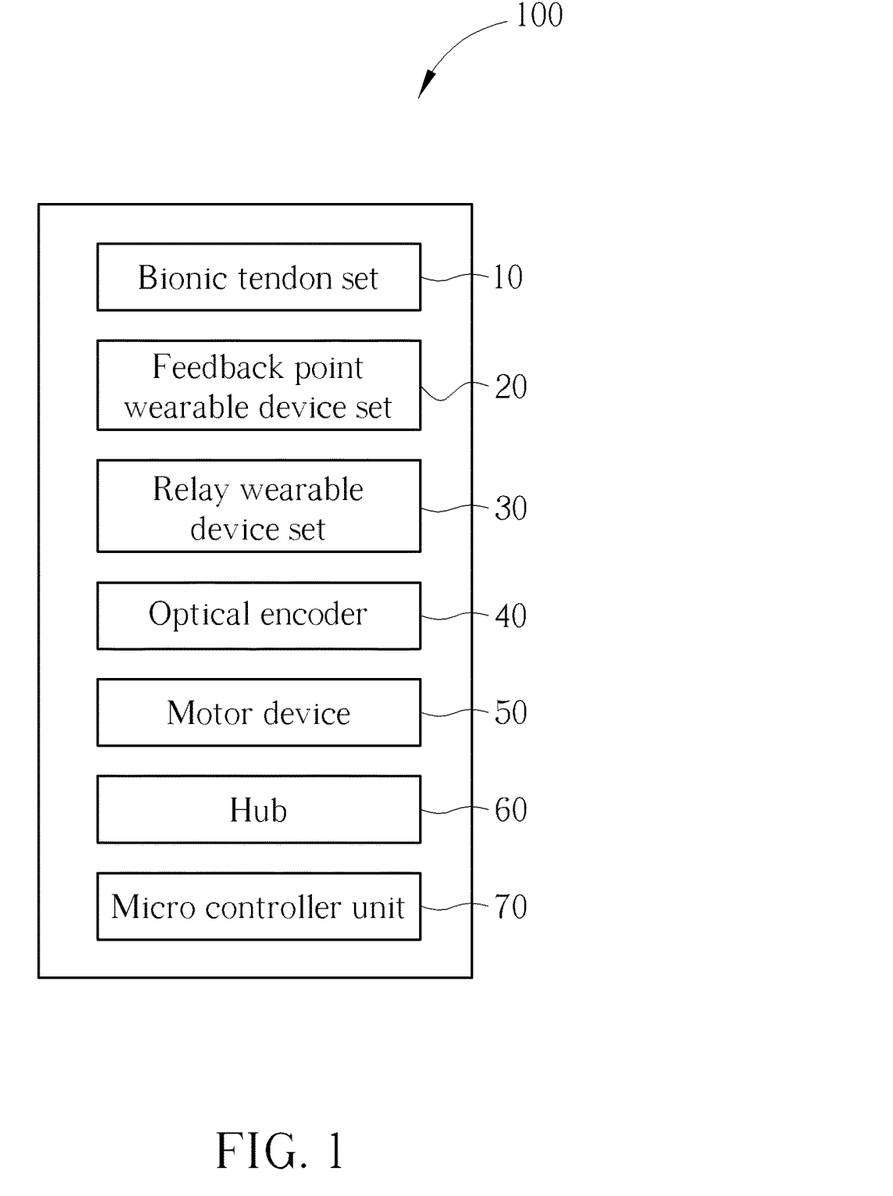
FIG. 1 is a functional diagram illustrating a tactile feedback system according to an embodiment of the present invention

FIG. 1 is a functional diagram illustrating a tactile feedback system 100 according to an embodiment of the present invention. The tactile feedback system 100 includes a bionic tendon set 10, a feedback point wearable device set 20, a relay wearable device set 30, an optical encoder 40, a motor device 50, a hub 60, and a micro controller unit (MCU) 70.

The feedback point wearable device set 20 may include a plurality of feedback point wearable devices which are put on different feedback parts of a user. The bionic tendon set 10 includes a plurality of bionic tendons, each of which includes a first end fixed to a corresponding feedback point wearable device in the feedback point wearable device set 20 and a second end accommodated in the hub 60. According to VR content, the MCU 70 may instruct the motor device 50 to pull or release corresponding bionic tendons of the bionic tendon set 10 using different frequencies and strengths, thereby providing various tactile feedbacks (such as shake/impact/weight) on different feedback parts of the user. The relay wearable device set 30 includes a plurality of relay wearable devices which are put on the user between different feedback parts and the hub 60 to prevent the bionic tendon set 10 from detaching from user body without impeding the process of pulling or releasing the bionic tendons. When a specific pulling force is applied, the optical encoder 40 may record the tension between the motor device 50 and the bionic tendon set 10, based on which the MCU 70 may identify the current posture of the user.

In an embodiment, the feedback point wearable device set 20 may include a wristband, an ankle band or a chest band, and the relay wearable device set 60 may include an elbow brace or a knee band. However, the types of the feedback point wearable device set 20 and the relay wearable device set 30 do not limit the scope of the present invention.

Figure 2:
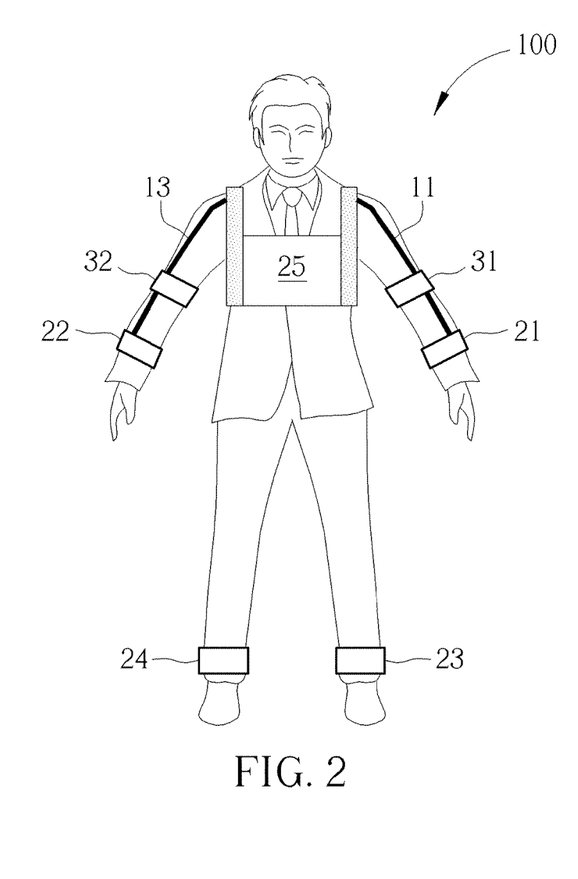
FIGS. 2-4 are diagrams illustrating the implementation of a tactile feedback system according to an embodiment of the present invention.
Figure 3:
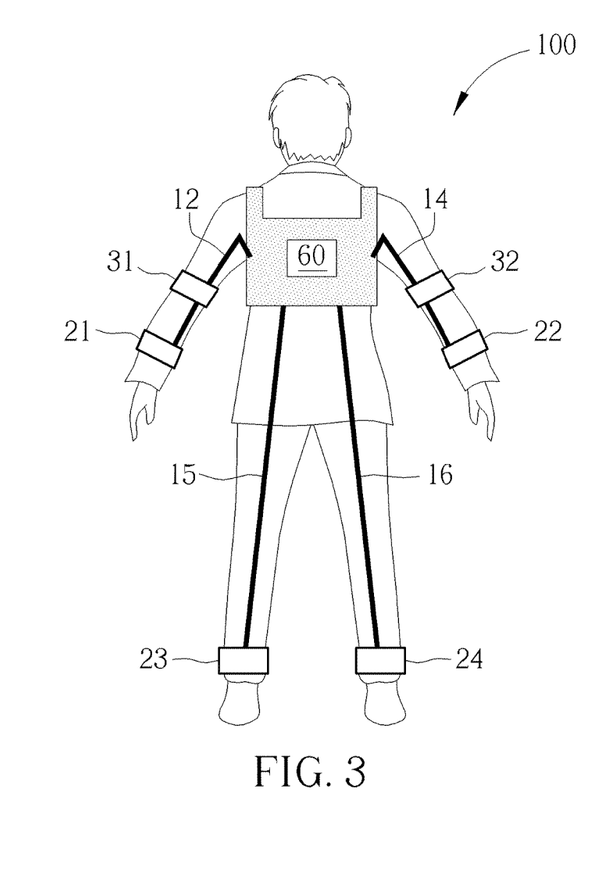
Figure 4:
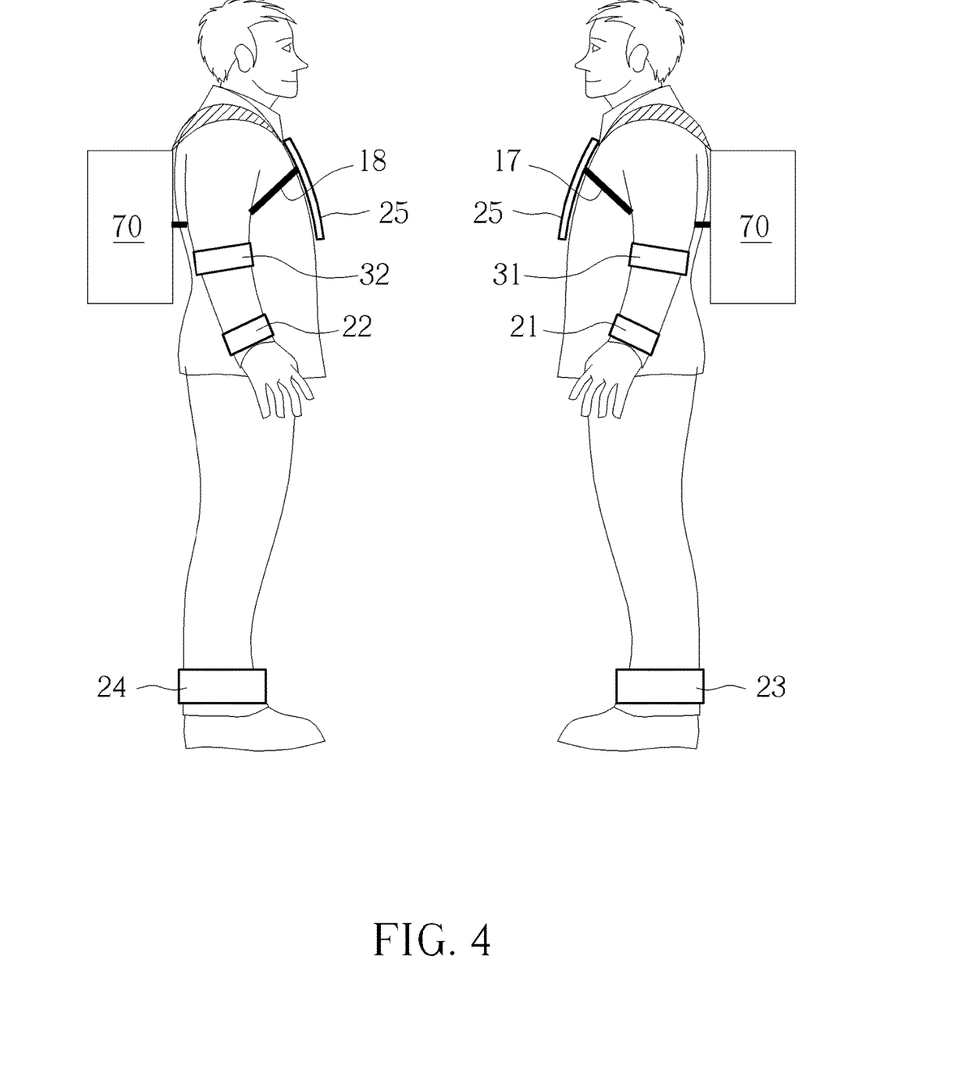

FIGS. 2-4 are diagrams illustrating the implementation of the tactile feedback system 100 according to an embodiment of the present invention. FIG. 2 depicts the front view of a user when wearing the tactile feedback system 100. FIG. 3 depicts the back view of the user when wearing the tactile feedback system 100. FIG. 4 depicts the side view of the user when wearing the tactile feedback system 100.

In the embodiment depicted in FIGS. 2-4, the bionic tendon set 10 includes bionic tendons 11-18, the feedback point wearable device set 20 includes a left wristband 21, a right wristband 22, a left ankle band 23, a right ankle band 24, and a chest band 25, and the relay wearable device set 30 includes a left elbow brace 31 and a right elbow brace 32. The hub 60 may be implemented as a backpack capable of accommodating the optical encoder 40, the motor device 50 and the MCU 70 (not shown in FIGS. 2-4).

Figure 5:
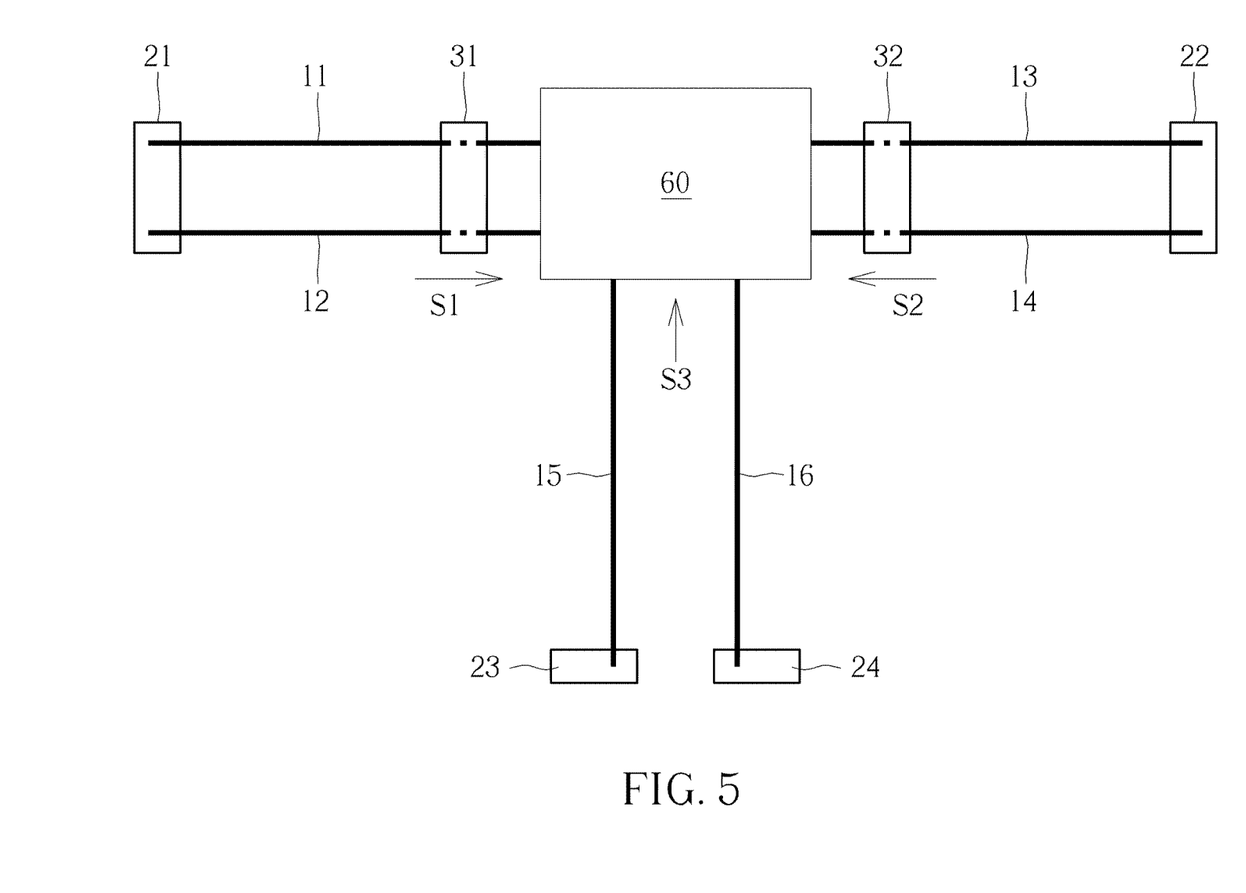
FIG. 5 is a diagram illustrating the connection of each device in a tactile feedback system according to an embodiment of the present invention.

FIG. 5 is a diagram illustrating the connection of each device in the tactile feedback system 100 according to an embodiment of the present invention. Each of the bionic tendons 11-12 includes a first end fixed to the left wristband 21, a middle part passing through the left elbow brace 31, and a second end accommodated in the hub 60. Each of the bionic tendons 13-14 includes a first end fixed to the right wristband 22, a middle part passing through the right elbow brace 32, and a second end accommodated in the hub 60. The bionic tendon 15 includes a first end fixed to the left ankle band 23 and a second end accommodated in the hub 60. The bionic tendon 16 includes a first end fixed to the right ankle band 24 and a second end accommodated in the hub 60. When the motor device 50 pulls the bionic tendons 11-16 (as indicated by arrows S1-S3) using different frequencies and strengths, the user may feel tactile feedbacks (such as shake/impact/weight) on his four limbs.

Similarly, as depicted in FIG. 4, when the motor device 50 pulls the bionic tendons 17-18 for changing the pressure applied to the front chest, the user may feel tactile feedbacks (such as shake/impact/weight) on his front chest.

Figure 6:
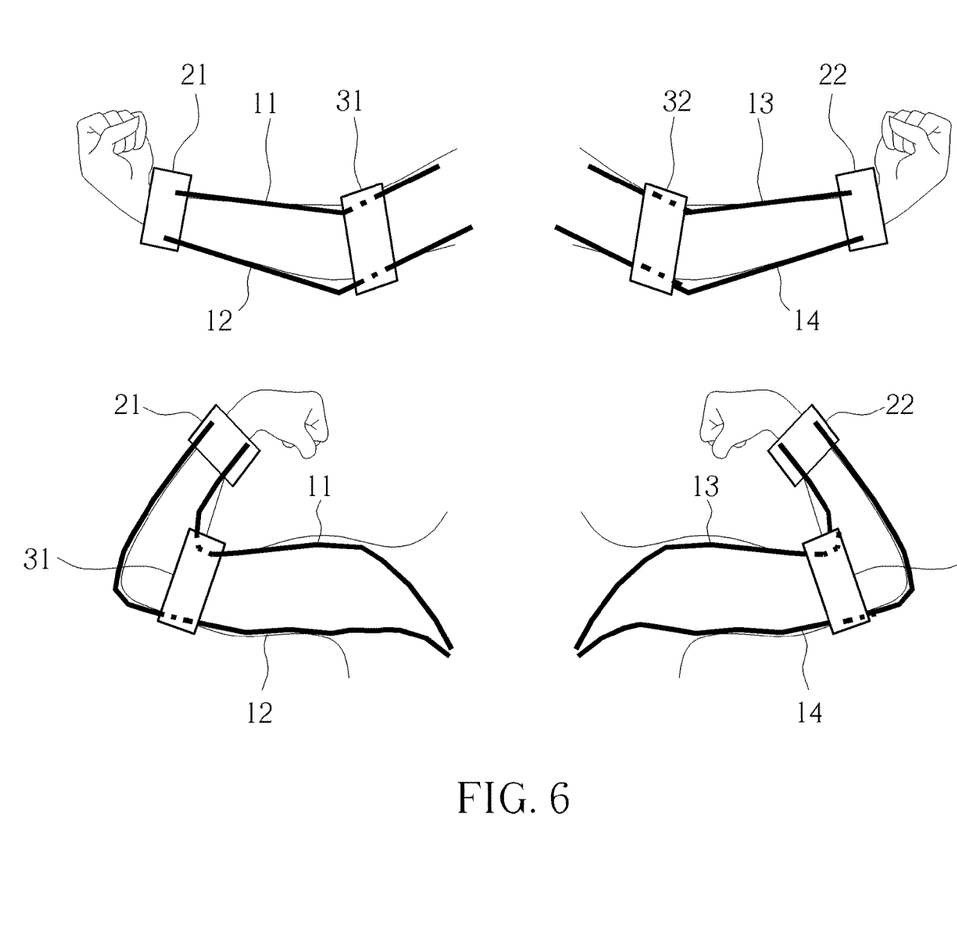
FIG. 6 is a diagram illustrating hand gestures of a user in VR applications according to an embodiment of the present invention.

FIG. 6 is a diagram illustrating possible hand gestures of a user in VR applications according to an embodiment of the present invention. The left elbow brace 31 and the right elbow brace 32 of the relay wearable device set 30 can prevent the bionic tendons 11-14 from detaching from user body due to different hand gestures.

Figure 7:
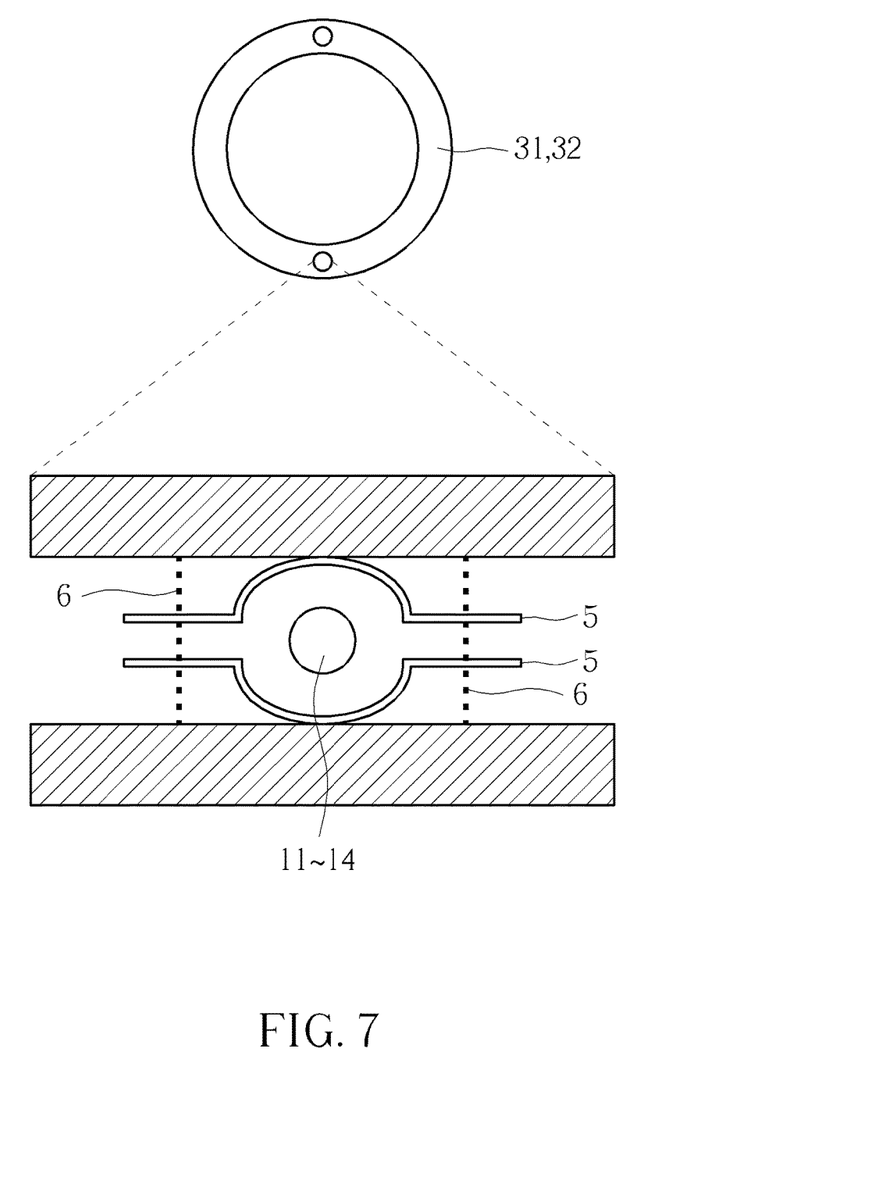
FIGS. 7-8 are diagrams illustrating the implementation of a relay wearable device set according to an embodiment of the present invention.
Figure 8:
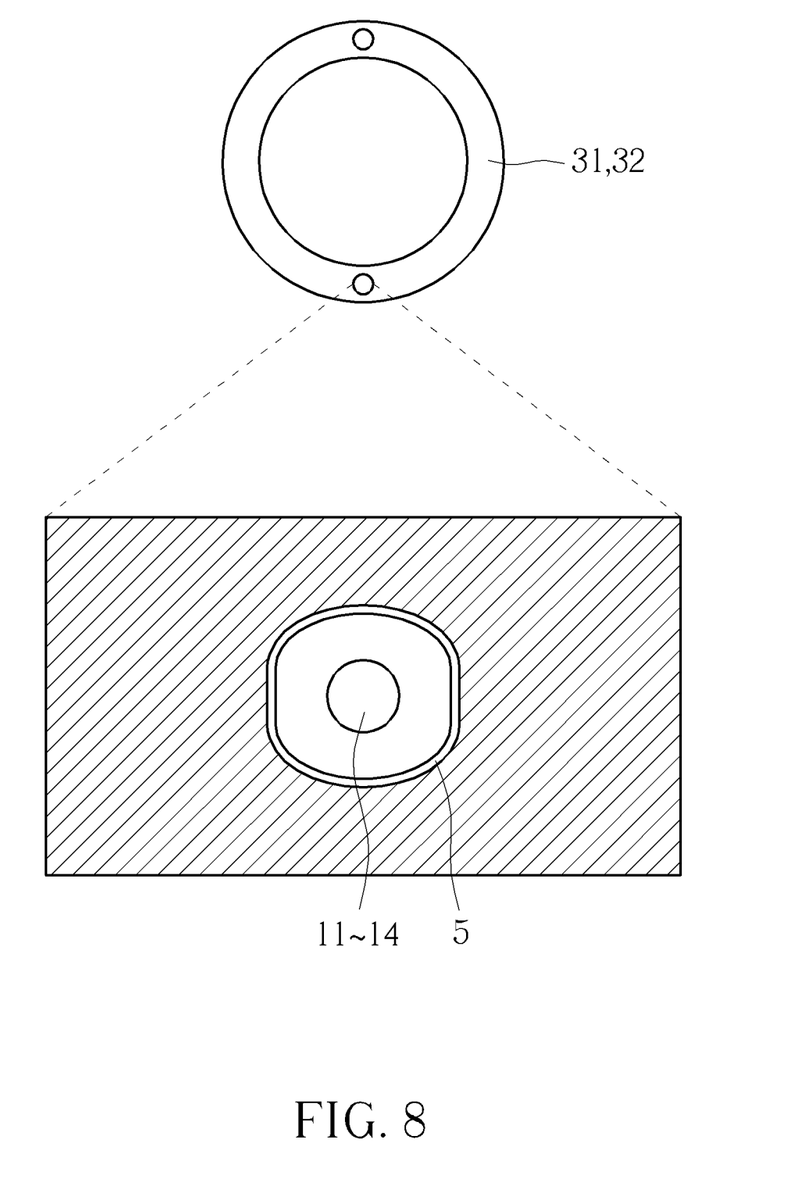

FIGS. 7-8 are diagrams illustrating the implementation of the relay wearable device set 30 according to an embodiment of the present invention. FIGS. 7-8 depict the top view of the left elbow brace 31 or the right elbow brace 32 shown in FIG. 5 along the arrow S1 or S2. In order to allow the bionic tendons 11-14 to move freely in the left elbow brace 31 and the right elbow brace 32, the relay wearable device set 30 includes tubes 5 each with a smooth inner surface. In the embodiment depicted in FIG. 7, the tubes 5 and the relay wearable device set 30 are sewn together using stitches 6, thereby allowing the bionic tendons 11-14 to move freely in corresponding tubes 5 in response to the pulling force of the motor device 50. In the embodiment depicted in FIG. 8, the tubes 5 may be embedded in the material of the relay wearable device set 30 using an insert injection molding technique, thereby allowing the bionic tendons 11-14 to move freely in corresponding tubes 5 in response to the pulling force of the motor device 50. However, the connection method and the type of the tubes 5 and the relay wearable device set 30 do not limit the scope of the present invention.

In the embodiment depicted in FIGS. 2-4, the relay wearable device set 30 includes the left elbow brace 31 and the right elbow brace 32. In another embodiment, the relay wearable device set 30 may further include a left knee band and a right knee band which are put on the left knee and the right knee of the user and allow the bionic tendons 15 and 16 to pass through, respectively. Therefore, the left knee band and the right knee band of the relay wearable device set 30 can prevent the bionic tendons 15 and 16 from detaching from user legs due to different leg gestures.

In the embodiment of the present invention, the motor device 50 may include a gear set configured to provide pulling forces with different frequencies and strengths to corresponding bionic tendons according to VR contents, thereby providing tactile feedbacks on the hands, legs or front chest of the user. In another embodiment, the gear set in the motor device 50 may further provide a damping function which increases or decreases the difficulty of user movement according to VR contents. For example, when the user is injured or carries heavy item in a VR game, the motor device 50 may use the damping function to increase the resistance faced by the user when pulling the bionic tendons. In an embodiment, the gear set in the motor device 50 may provide the damping function using a plurality of gears similar to those used in a bicycle shifter. In another embodiment, the gear set in the motor device 50 may provide the damping function using a sliding sheave structure similar to that used in a motorcycle shifter.

In the embodiment of the present invention, under a specific pulling force, the optical encoder 40 is configured to record the tension between the motor device 50 and the bionic tendon set 10 (such as recording the grad of the gear set in the motor device 50), thereby allowing the MCU 70 to execute a calibration procedure or determine the current posture of the user.

In order to compensate the variation in the physical stature or movement of different users, the present tactile feedback system 100 may execute a calibration procedure before running a VR application. After a user puts on the tactile feedback system 100, the MCU 70 is configured to instruct the motor device 50 to provide a constant pulling force to the bionic tendon set 10 and then instruct the user to perform some basic movements. The optical encoder 40 may record the amount of deformation of different bionic tendons during each basic movement, thereby allowing the strength of tactile feedbacks to be adjusted accordingly in a VR application. Also, during the VR application, the MCU 70 may determine the current posture of the user according to the data recorded by the optical encoder 40 and the information acquired in the calibration procedure.

In conclusion, the present invention provides a tactile feedback system using bionic tendons which may be fixed to different parts of a user using different wearable devices. By applying pulling forces with different frequencies and strengths to the bionic tendons, various tactile feedbacks (such as shake/impact/weight) may be provided on different feedback parts of the user. The bionic tendons are light and its accuracy is not affected by human sweat. Also, the operation of the bionic tendons during VR applications does not cause any harm to human body.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A tactile feedback system using bionic tendons, comprising:
   a hub;
   a feedback point wearable device set including a first feedback point wearable device which is put on a first feedback part of a user;
   a bionic tendon set including a first bionic tendon having a first end fixed to the first feedback point wearable device and a second end accommodated in the hub;

a motor device configured to apply a first pulling force to the first bionic tendon; and a micro controller unit configured to instruct the motor device to adjust a value of the first pulling force according to a virtual reality content, thereby providing a first tactile feedback at the first feedback part of the user.

2. The tactile feedback system of claim 1, wherein the first feedback point wearable device is a wristband or an ankle band, and the first feedback part is a wrist or an ankle of the user.

3. The tactile feedback system of claim 1, wherein:
the bionic tendon set further includes a second bionic tendon having a first end fixed to the first feedback point wearable device and a second end accommodated in the hub; and
the motor device is further configured to apply the first pulling force to the second bionic tendon.

4. The tactile feedback system of claim 3, wherein the first feedback point wearable device is a wristband or a chest band, and the first feedback part is a wrist or a front chest of the user.

5. The tactile feedback system of claim 3, further comprising a relay wearable device which is put on a relay part of the user for providing a first channel and a second channel, wherein:
the first bionic tendon passes through the first channel;
the second bionic tendon passes through the second channel; and
the relay part is located between the first feedback part and the hub.

6. The tactile feedback system of claim 5, wherein the first feedback point wearable device is a wristband or an ankle band, the relay wearable device is an elbow brace or a knee band, and the first feedback part is a wrist or an ankle of the user.

7. The tactile feedback system of claim 5, further comprising a first tube and a second tube attached to the relay wearable device using a sewing method or embedded in a material of the relay wearable device using an insert injection molding technique, thereby providing the first channel and the second channel, respectively.

8. The tactile feedback system of claim 1, wherein:
the feedback point wearable device set further includes a second feedback point wearable device which is put on a second feedback part of the user;
the bionic tendon set further includes a second bionic tendon having a first end fixed to the second feedback point wearable device and a second end accommodated in the hub;
the motor device is further configured to apply a second pulling force to the second bionic tendon; and
the micro controller unit is further configured to instruct the motor device to adjust a value of the second pulling force according to the virtual reality content, thereby providing a second tactile feedback at the second feedback part of the user.

9. The tactile feedback system of claim 1, wherein motor device includes a gear set configured to provide a damping using a plurality of gears or a sliding sheave structure.

10. The tactile feedback system of claim 9, further comprising an optical encoder configured to record a grad of the gear set, thereby acquiring an amount of deformation of the first bionic tendon.

\* \* \* \* \*